UNITED STATES PATENT OFFICE.

WILLIAM MORRISON, OF DES MOINES, IOWA.

STORAGE-BATTERY ELECTRODE AND PROCESS OF MAKING IT.

1,008,854.

Specification of Letters Patent.  Patented Nov. 14, 1911.

No Drawing.   Application filed September 29, 1911.  Serial No. 651,963.

*To all whom it may concern:*

Be it known that I, WILLIAM MORRISON, a citizen of the United States, residing at Des Moines, in the county of Polk and State of Iowa, have invented certain new and useful Improvements in Storage-Battery Electrodes and Processes of Making Them, of which the following is a specification.

This invention especially relates to the production of negative-pole electrodes for storage or secondary batteries in which the active material is finely-divided lead.

The preferred process of making the electrode is as follows: An antimonial lead grid or other suitable support and conductor is pasted with a mixture of litharge and red-lead, wetted with an aqueous solution of sulfuric acid and a small amount of hydrogen peroxid, and allowed to thoroughly dry. The amount of litharge in the mixture is preferably greater than that of the red-lead. The surfaces of the active material are then scraped, as with a sharp-edged tool, to remove any glaze or skin and open the surficial pores. The electrode is then dipped in an aqueous solution of glycerin and chromium sulfate, the preferred proportions being six pounds of glycerin and one pound of chromium sulfate in five gallons of distilled water. The electrode is then dried and is dipped in an aqueous solution of sulfuric acid containing some hydrogen peroxid, and is again allowed to dry, causing the paste to fully swell and come in close contact with the grid. The pasted grid is formed by subjecting it to cathodic reduction in an aqueous sulfuric acid solution, substantially eliminating the glycerin, and is washed in water, whereupon it is ready for use.

The process may be modified by causing the paste to swell by dipping it in the solution of sulfuric acid and hydrogen peroxid and drying it before, instead of after, it is dipped in the solution of glycerin and chromium sulfate.

Such electrodes substantially maintain their initial charge-capacity for a long period, and have a large capacity and great durability.

While the superior qualities of electrodes made by this process have been established by protracted tests, regardless of theory, it may be stated that the glycerin apparently acts by initially combining with the litharge to bind the particles of active material to each other and to the grid, and to thereby give the paste mechanical strength until the electrode is electrolytically formed; that the chromium compound apparently reacts to form a lead-chromium compound which constitutes a permanent binder; and that the red-lead gives porosity.

I claim:

1. A storage battery electrode, comprising a body of active material initially bonded by the solid reaction-products of lead oxid, a chromium salt and glycerin.

2. A storage battery electrode, comprising a body of active material bonded by the solid reaction-product of lead oxid and a chromium salt.

3. A storage battery electrode, comprising a body of lead active material initially bonded by lead-chromium and lead-glycerin compounds.

4. A storage battery electrode, comprising a body of lead active material having intimately commingled therewith a lead-chromium compound, constituting a permanent binder.

5. In the manufacture of storage battery electrodes, the step which consists in initially bonding the active material with lead-chromium and lead-glycerin compounds.

6. In the manufacture of storage battery electrodes, the step which consists in bonding the active material with a lead-chromium compound distributed throughout said active material.

7. In the manufacture of storage battery electrodes having lead active material, the step which consists in impregnating the active material with a solution of a chromium compound capable of reacting therewith to produce a binder.

8. The process of treating storage battery electrodes having lead active material, which comprises the step of submerging the electrode in a solution containing glycerin.

9. In the manufacutre of storage battery electrodes having lead active material, the step which consists in reacting on the active material with a chromium compound producing a lead-chromium binder, and with glycerin.

10. The process of making negative-pole storage battery electrodes having pasted lead active material, which consists in both expanding the active material and impregnating it with a solution of a chromium compound capable of producing a binder, and glycerin.

In testimony whereof I affix my signature in presence of two witnesses.

WILLIAM MORRISON.

Witnesses:
 CHARLES H. POTTER,
 ROBERT I. HULSIZER.